United States Patent [19]
Vortmann

[11] 4,064,016
[45] Dec. 20, 1977

[54] TRANSFER DEVICE

[75] Inventor: Walter Vortmann, Garbsen, Germany

[73] Assignee: Volkswagenwerk Aktiengesellschaft, Wolfsburg, Germany

[21] Appl. No.: 771,512

[22] Filed: Feb. 24, 1977

[30] Foreign Application Priority Data

Mar. 6, 1976 Germany .............................. 2609303

[51] Int. Cl.² .......................................... B65G 47/90
[52] U.S. Cl. .................................. 198/412; 198/457; 198/488; 214/1 BD
[58] Field of Search ............... 198/375, 403, 412, 413, 198/457, 480, 487, 488, 489, 803, 951; 214/1 BD

[56] References Cited

U.S. PATENT DOCUMENTS

| 3,151,728 | 10/1964 | Schmermund | 198/951 |
| 3,367,517 | 2/1968 | Dallape et al. | 214/1 Q |

FOREIGN PATENT DOCUMENTS

| 2,353,009 | 5/1974 | Germany | 198/488 |

Primary Examiner—Evon C. Blunk
Assistant Examiner—James L. Rowland
Attorney, Agent, or Firm—Spencer & Kaye

[57] ABSTRACT

A transfer device for transferring articles from the delivery end of a first conveyor to the receiving end of a second conveyor, which conveyors are so arranged that they convey articles in two directions which lie in an at least approximately horizontal plane and form with each other an angle that is other than 180°. The transfer device is provided with a shaft which is mounted for rotation on a stationary component about an axis which at least approximately bisects the angle formed between the two conveying directions. A carrier arm is fixedly connected to the shaft and is arranged between the delivery end of the first conveyor and the receiving end of the second conveyor. A pick-up is connected to the carrier arm and has a pivotable axle carrying supports which are adapted to engage the underside of an article which is at the delivery end of the first conveyor. A transmission is interposed between the stationary component and the pivotable axle for maintaining the supports below the article during rotation of the shaft which effects transfer of the article from the delivery end of the first conveyor to the receiving end of the second conveyor. Consequently, the supports support the article being transferred throughout the entire transfer operation.

12 Claims, 6 Drawing Figures

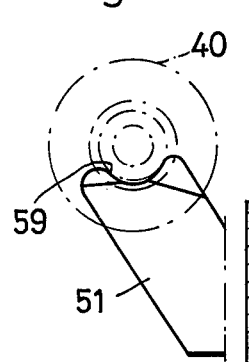
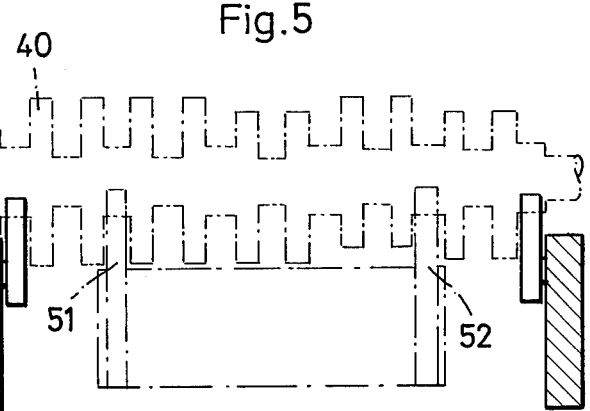
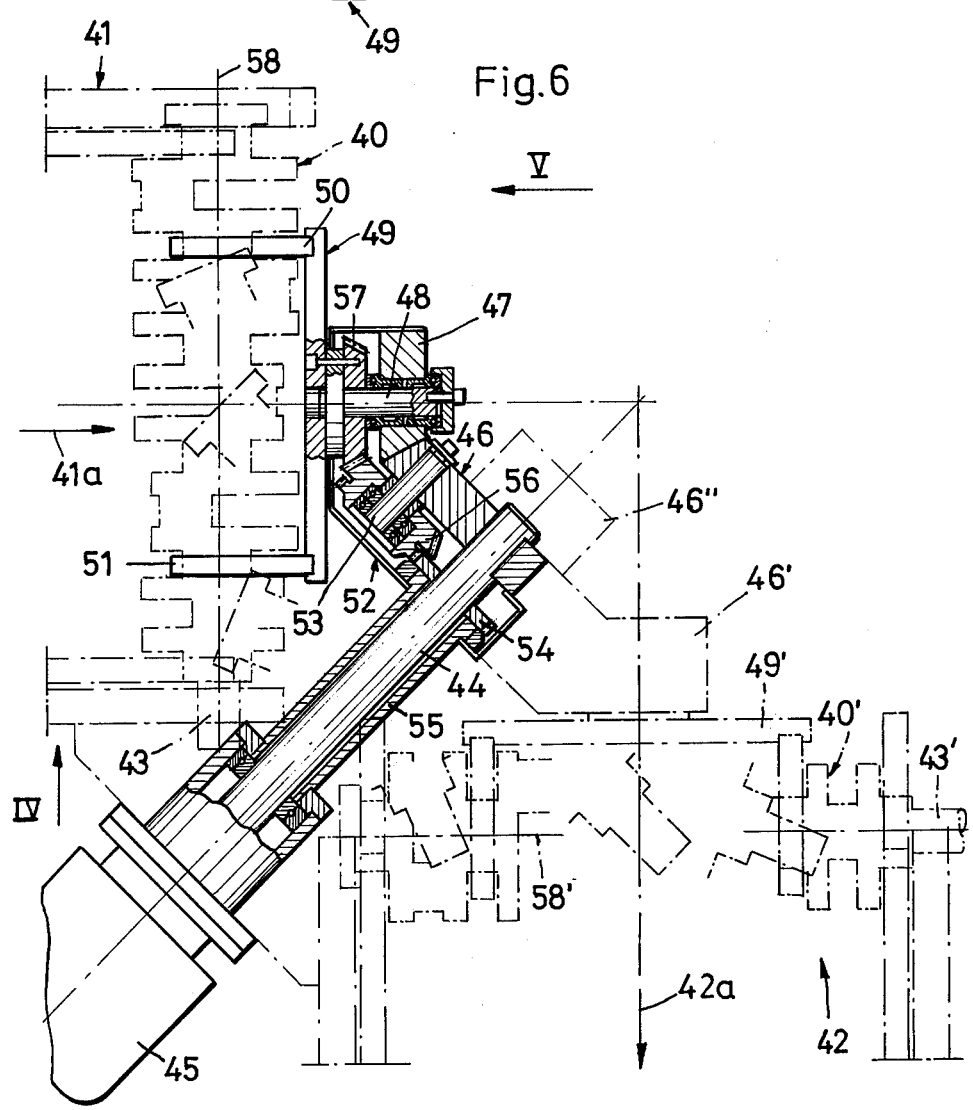

TRANSFER DEVICE

BACKGROUND OF THE INVENTION

The present invention relates to a transfer device for transferring articles from the delivery end of one conveyor to the receiving end of another conveyor, with the two conveyors being so arranged that they convey articles in two directions which lie in an at least approximately horizontal plane and form with each other an angle that is other than 180°.

A transfer device of the above type is used, for example, in the course of a manufacturing process where articles have to be transported from one work station to another, or from one piece of machinery to another, along a path which is something other than a straight line. The reason for this is that, depending on the shape and type of article to be conveyed, it is often expensive and/or difficult, if not impossible, to provide a conveyor which is able to transport the articles other than rectilinearly, i.e., along a curved path. One reason for this is that transporting articles along a curved path makes it necessary to reduce the conveying speed along the inside of the curve and/or to increase the conveying speed along the outside of the curve. This is frequently impossible or impractical, especially when the conveyors are built in such a way that the articles on them take up as little space as possible, which means that the articles are placed closely together, thus making it physically impossible to impart to the conveyor a configuration which would allow it to move in any manner other than rectilinearly.

It is, therefore, the primary object of the present invention to provide a transfer device by means of which articles can be transferred from one conveyor to another, specifically, from the delivery end of a first conveyor to the receiving end of a second conveyor, which conveyors are so arranged that they convey articles in two directions which lie in an at least approximately horizontal plane and form with each other an angle that is other than 180°.

BRIEF DESCRIPTION OF THE INVENTION

With the above object in view, the present invention resides in a transfer device of the above type, the same being provided with a shaft which is mounted for rotation on a stationary component about an axis which at least approximately bisects the angle formed between the two conveying directions. A carrier arm is fixedly connected to the shaft and is arranged between the delivery end of the first conveyor and the receiving end of the second conveyor. A pick-up is connected to the carrier arm and has a pivotable axle carrying support means which are adapted to engage the underside of an article which is at the delivery end of the first conveyor. A transmission is interposed between the stationary component and the pivotable axle for maintaining the support means below the article during rotation of the shaft which effects transfer of the article from the delivery end of the first conveyor to the receiving end of the second conveyor. Consequently, the support means support the article being conveyed throughout the entire transfer operation.

BRIEF DESCRIPTION OF THE DRAWINGS

FIGS. 4, 5 and 6 show another embodiment of a transfer device according to the present invention, with FIG. 6 being a plan view, partly in section, and FIGS. 4 and 5 being elevational views, partly in section, as seen in the directions of the arrows IV and V, respectively, of FIG. 6.

DETAILED DESCRIPTION OF THE PREFERRED EMBODIMENTS

Figure 1:
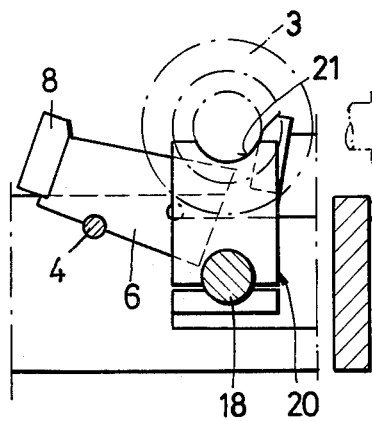
FIGS. 1, 2 and 3 show one embodiment of a transfer device according to the present invention, with FIG. 3 being a plan view, partly in section, and FIGS. 1 and 2 being elevational views, partly in section, as seen in the directions of the arrows I and II, respectively, of FIG. 3.
Figure 2:
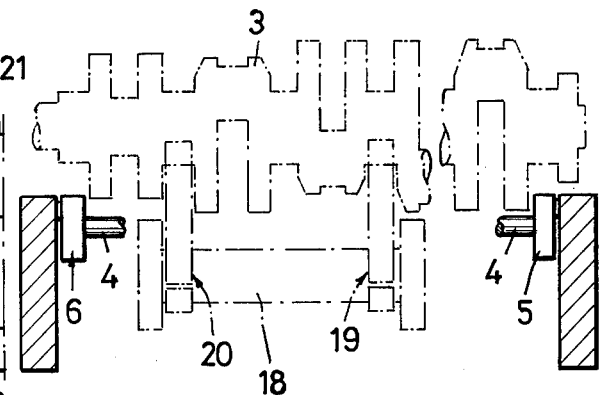
Figure 3:
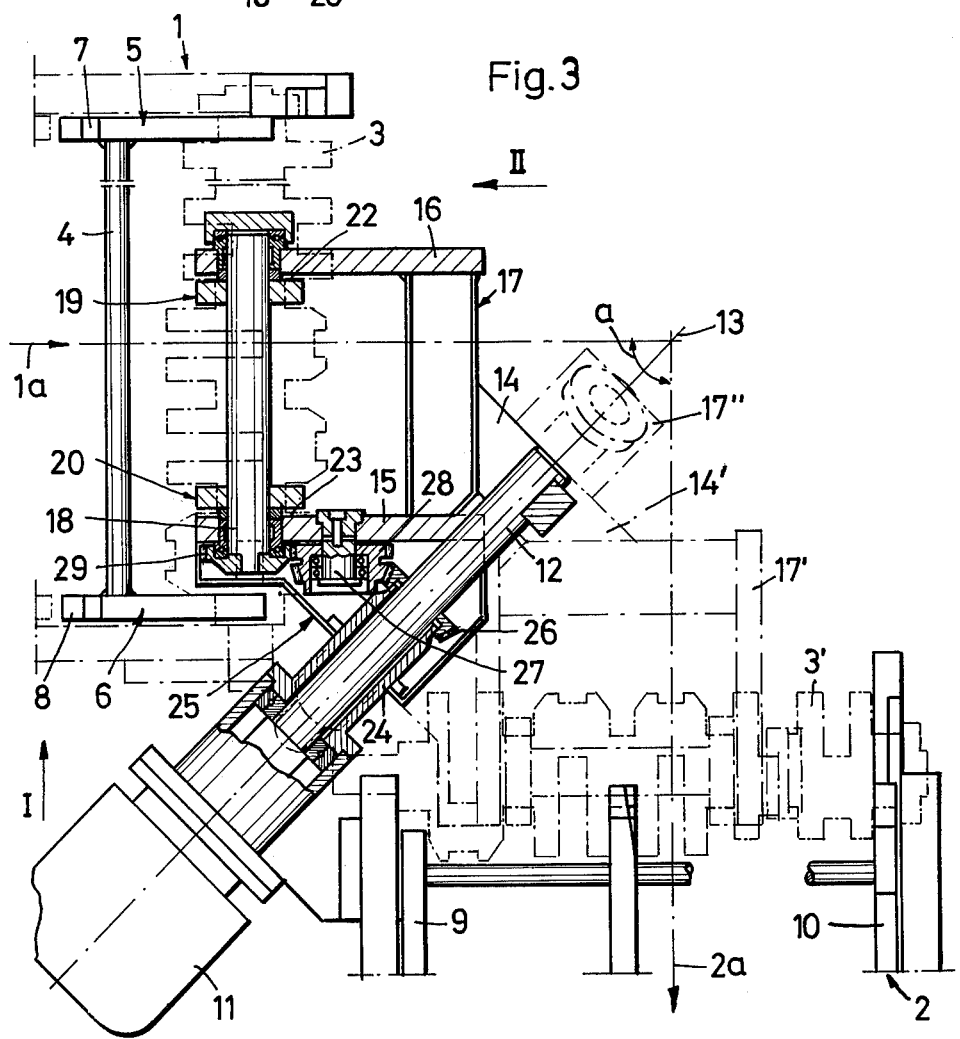

Referring now to the drawings and first to FIGS. 1, 2 and 3 thereof, the same show two conveyors 1 and 2 for conveying articles in two directions 1a and 2a, respectively, which lie in an at least approximately horizontal plane and form an angle $a$ between themselves. The articles to be conveyed can be work pieces such as motor vehicle engine crankshafts shown in dot-dash lines at 3 and 3'. The first conveyor 1 comprises a plurality of pairs of ratchets 5, 6, with the ratchets of each pair being pivotable about a common axle 4 and being capable of assuming a plurality of angular positions. The configuration of one such ratchet is best depicted in FIG. 1. In one particular angular position (not shown), abutment regions 7, 8 of the ratchets will have been swung down, so that work pieces which are fed from the left, as viewed in FIGS. 1 and 3, can be delivered from a preceding ratchet pair 5, 6 and run onto the next ratchet pair. The weight of the work piece will cause the ratchet pair which has just taken up the work piece to pivot such that the ratchets will occupy a generally horizontal position, whereupon the abutment regions 7, 8 will in fact serve as abutments for any further work pieces being fed in from the left. The ratchet pair can, moreover, be pivoted into the position shown in the drawings, this being a position in which the work pieces, which themselves have rotationally symmetrical regions, will tend to roll off toward the right, again as viewed in FIGS. 1 and 3. The entire conveying process, including the actuation of the transfer device, to be described below, is controlled by cams and/or electrical contacts, in a manner well known in the art.

The second conveyor 2 is equipped with similar ratchet pairs 9, 10.

The transfer device according to the present invention, by means of which work pieces are transferred from the delivery end of the first conveyor 1 to the receiving end of the second conveyor 2, incorporates an electric drive motor 11 which drives a shaft 12 that is firmly connected to the rotor of the drive motor. The axis 13 about which the shaft 12 rotates is horizontal and is so oriented that it at least approximately bisects the angle $a$ formed between the conveyor directions 1a, 2a. While the angle $a$ is equal to 90° in the illustrated embodiment, the transfer device is by no means limited for use in an arrangement wherein the angle $a$ is a right angle, but can be used in an arrangement wherein the angle is anything other than 180°.

The shaft 12 has fixedly connected to it a carrier arm 14 which itself is provided with two arms 15 and 16 so as to form a generally fork-shaped pick-up 17. The arms 15, 16 carry a pivotable axle 18 which is mounted in the region of the free ends of the arms by means of conventional ball bearings which need not be described in detail. As is best shown in FIGS. 1 and 2, the axle 18 is located below the work pieces which are being conveyed. The axle 18 carries two supports 19, 20 which are themselves non-rotationally secured to the axle. The supports 19, 20 are provided with openings 21 which, when the supports are in the position shown in solid lines in FIG. 3, are directed upwardly, as best seen in connection with support 20 in FIG. 1. This allows the supports 19, 20 to receive and support the work pieces during the transfer from one conveyor to the other. The supports 19, 20 have support surfaces 22, 23, respectively, which are directed toward and coact with engaging surfaces of the work pieces. The support surfaces 22, 23 are provided because the axle 18, and therefore a work piece carried by the pick-up 17, will, during the transfer step, that is to say, during rotation of the shaft 12, follow a path which is defined by a conical surface about the axis 13. This means that the work piece will, at various stages in the transfer operation, be moved out of the horizontal position it occupies while resting on either of the conveyors and assume an inclined position, and it is the purpose of the support surfaces 22, 23 to secure the inclined work pieces from slipping off the supports 19, 20. In the course of this transfer, the pivoting carrier arm 14 and the pick-up 17 are moved from the receiving position shown in solid lines into their other end position, shown in dot-dash lines at 14′, 17′, this being the position in which the work piece, now shown at 3′, is deposited onto the receiving end of the second conveyor 2.

In practice, the transfer device is so constructed that the pick-up 17 can be swung down further, namely, into a rest position indicated at 17″ in which the components extend generally downwardly between the delivery and receiving ends of the conveyors 1 and 2, respectively.

Suitable provision is made for ensuring that in the course of the transfer step, the supports 19 and 20 continually support the work pieces 3 from below, that is to say, to ensure that the openings 21 will at all times be directed upwardly. This is achieved with the help of a transmission which is interposed between the axle 18 and a stationary component, such as the housing 24 for the shaft 12. In the illustrated embodiment, this transmission is in the form of a gearing arrangement indicated generally at 25. This gearing arrangement comprises a bevel gear 26 which is non-rotationally connected to the housing 24 and meshes with a second bevel gear which itself is part of a composite gear 28 the other part of which is a gear which meshes with yet another gear 29. The composite gear 28 is rotationally mounted on a shaft 27, while the gear 29 is non-rotationally connected to the axle 18. The gearing arrangement thus comprises an odd number of gear axes, namely, those of the parts 12, 27 and 18, so that the supports 19, 20 will remain in proper position throughout the transfer step.

The embodiment described above is one in which work pieces will retain their original orientation with respect to the conveying direction as they are being transferred from conveyor 1 to conveyor 2. In contradistinction thereto, the embodiment of FIGS. 4, 5 and 6 is one in which the transfer device not only transfers the work pieces from the delivery end of one conveyor to the receiving end of the other but at the same time turns the work piece, so that the transfer device serves as a device for both transferring and re-orienting the work pieces. This is best shown in FIG. 6, which illustrates the first conveyor 41 and the second conveyor 42, their conveying directions being indicated at 41a and 42a, respectively. The end 43 of the work piece, shown in dot-dash lines at 40 at the delivery end of the conveyor 41, which is on the right-hand side of the conveying direction 41a, will, after having been deposited on the conveyor 42, lie on the left-hand side of the conveying direction 42a, as shown at 40′, 43′. It will be appreciated that, for example in an assembly line operation in which it is desired to re-orient the work pieces, the provision of a transfer device which effects this re-orientation makes it unnecessary to provide a separate orientation changing device.

Reverting to the description of the embodiment of FIGS. 4 to 6, it is again assumed that the articles being conveyed are crankshafts. Likewise, the transfer device of this embodiment comprises, as one of its components, a shaft 44 which is turned by means of an electric motor 45, which itself is controlled by control signals. As is the case with the axis 13 of the shaft 12 in the embodiment of FIGS. 1 to 3, the shaft 44 is so aligned that its axis bisects the angle between the two conveying directions 41a, 42a.

A carrier arm 46 is fixedly connected to the shaft 44 and lies between the two ends of the conveyors 41 and 42, the arm 46 being provided with an angled portion or dog leg 47 which is transverse with respect to the first conveying direction 41a. An axle 48 is pivotally connected to the dog leg portion 47 and is itself connected to the fork-shaped pick-up 49 that incorporates two supports 50, 51. In this embodiment, the supports 50 and 51 are fixedly connected to the pick-up 49. As best shown in FIG. 4 in connection with the support 51, the supports 50, 51, are provided with upwardly directed openings 59 which receive the work pieces to be transferred from the delivery end of the conveyor 41 to the receiving end of the conveyor 42. Here, too, there are transmission means for maintaining the components 46, 49, 50, 51 in their proper position as they are swung from the position shown in solid lines to the position 46′, 49′ shown in dot-dash lines, i.e., the openings 59 are kept pointing generally upwardly so as to enable the supports 50, 51 to carry the work pieces, this being accomplished by causing the pick-up 49 to occupy a position in which it lies in a horizontal plane throughout the entire transfer operation.

As in the previously described embodiment, the parts are maintained in the desired position with the help of a transmission which is in the form of a gearing arrangement 52 incorporating an odd number of axes, namely, the axis of the shaft 44, the axis of the axle 48, and the axis of an intermediate axle 53. A first gear 54 is non-rotationally connected to the stationary housing 55 of the shaft 44, this gear 54 meshing with one part of a composite gear 56 which is rotatably mounted on the axle 53. Another part of the composite gear 56 is constituted by a bevel gear which meshes with another bevel gear 57 which itself is non-rotatably connected to the pick-up 49. In this way, the work piece 40 will be moved in such a manner that its axis 58 will at times remain horizontal but will, during the transfer step, be swung transversely so that when the work piece comes to lie on the second conveyor 42, the work piece and axle will occupy the position shown in dot-dash lines at 40′, 58′. Inasmuch as the work piece will at all times remain horizontal, it will be moved in a direction parallel to itself.

Various intermediate positions of the work piece are shown in dot-dash lines in FIG. 6.

Here, too, the transfer device can be so constructed as to enable it to assume a rest position, shown in FIG. 6 at 46″, in which the arm 46 is swung downwardly and occupies a position between the ends of the two conveyors 41 and 42.

In practice, the gear ratio between the gears 26/28 and 28/29 in the embodiment of FIGS. 1 to 3 and the gears 54/56 and 56/57 in the embodiment of FIGS. 4 to 6 is, in each case, 1:1.

It will be seen from the above that, thanks to the present invention, there is provided a way in which articles can be transferred from one conveyor to another, thus allowing the uninterrupted transport of articles along a non-rectilinear path, without it being necessary to provide a complicated "around the corner" conveying system. The intended result is accomplished in a simple way, it being unnecessary to provide cranes, hooks, gripping devices and their actuating mechanisms, or other means, which would pick up the articles from the top and carry them from one conveyor to the other. Instead, the arrangement of the parts is such that the articles being transferred are engaged from below, and continually remain supported from below during the entire transfer operation, thus imparting great versatility to the transfer device. All this is accomplished with structurally simple means, which can easily be constructed so as to provide a strong, trouble-free piece of equipment.

It will, moreover, be appreciated that, thanks to the two embodiments described above, one can select a transfer device which will transfer the articles in such a way as to maintain their orientation with respect to the conveying direction, or a transfer device which will not only transfer the articles from one conveyor to the other but will at the same time re-orient the articles. The last-mentioned embodiment, while able to carry out this double function, is, from the structural point of view, no more complicated than the first-mentioned embodiment, so that in the final analysis the only thing that has to be taken into consideration when selecting between the two embodiments is the question of whether or not it is desired to re-orient the articles as they are transferred from one conveyor to the other.

In addition, it will be appreciated that the construction of the transfer device itself is for all practical purposes completely independent of the structure of the conveyors involved, so that so long as the conveyors permit access to the underside of the articles, a transfer device according to the present invention can be used with existing conveyors.

It will be understood that the above description of the present invention is susceptible to various modifications, changes and adaptations, and the same are intended to be comprehended within the meaning and range of equivalents of the appended claims. For example, the invention is not limited for use with conveyors transporting crankshafts, this particular article having been selected solely by way of illustration. In practice, the transfer device can be used to transfer virtually any type of article or work piece, or groups of articles or work pieces, including containers which hold articles, in which case the containers would be deemed to be the articles being handled.

What is claimed is:

1. A transfer device for transferring articles from the delivery end of a first conveyor to the receiving end of a second conveyor, which conveyors convey articles in two directions which lie in an at least approximately horizontal plane and form with each other an angle other than 180°, the transfer device comprising:

a. a shaft mounted for rotation on a stationary component about an axis which at least approximately bisects said angle;
   b. a carrier arm fixedly connected to said shaft and being arranged between the delivery end of the first conveyor and the receiving end of the second conveyor;
   c. a pick-up connected to said carrier arm and having a pivotable axle carrying support means adapted to engage the underside of an article which is at the delivery end of the first conveyor; and
   d. transmission means interposed between said stationary component and said pivotable axle for maintaining said support means below the article during rotation of said shaft which effects transfer of the article from the delivery end of the first conveyor to the receiving end of the second conveyor, in consequence of which said support means support the article being transferred throughout the entire transfer operation.

2. A transfer device as defined in claim 1, wherein said support means, when said pick-up occupies a receiving position in which it is able to receive an article to be transferred, are directed toward the conveying direction of the first conveyor.

3. A transfer device as defined in claim 2, wherein, when said pick-up is in said receiving position in which it is able to receive an article to be transferred, said pivotable axle is transverse to said conveying direction of the first conveyor and is below the article, wherein said support means are provided with openings which, when said pick-up is in said receiving position, are upwardly directed thereby to enable said support means to receive and support the article, wherein said support means are further provided with at least one support surface which is directed against an abutment surface of the article thereby to secure the article against slipping off said support means, and wherein said transmission means are constructed to maintain said support means so oriented that their openings remain upwardly directed during the transfer operation.

4. A transfer device as defined in claim 3, wherein said support means are non-rotationally secured to said pivotable axle and wherein said transmission means coact with said axle.

5. A transfer device as defined in claim 3, wherein said pick-up has a generally fork-shaped configuration which includes two arms, said axle being pivotably mounted in the regions of the free ends of said arms.

6. A transfer device as defined in claim 2, wherein, when said pick-up is in said receiving position in which it is able to receive an article to be transferred, said pivotable axle extends in said conveying direction of the first conveyor, wherein said support means are provided with openings which are upwardly directed thereby to enable said support means to receive the article, and wherein said transmission means are constructed to maintain said support means so oriented that their openings remain upwardly directed during the transfer operation.

7. A transfer device as defined in claim 6, wherein said axle is pivotably mounted on said carrier arm, wherein said pick-up and axle are non-rotationally connected to each other, and wherein said transmission means coact with said axle.

8. A transfer device as defined in claim 6, wherein said pick-up, together with said support means, has, as seen from above, a generally fork-shaped configuration and lies in a generally horizontally oriented plane, and wherein said transmission means are constructed to maintain said pick-up in substantially horizontal orientation throughout the entire transfer operation.

9. A transfer device as defined in claim 1, wherein said transmission means comprise gear means.

10. A transfer device as defined in claim 9, wherein said gear means include a gear which is mounted on said stationary component.

11. A transfer device as defined in claim 10, wherein said stationary component is a housing for said shaft.

12. A transfer device as defined in claim 9, wherein said gear means include a gear train whose individual gears are mounted on a plurality of respective gear axes, said plurality of gear axes being an odd number.

* * * * *